(12) United States Patent
Letter

(10) Patent No.: US 11,833,373 B1
(45) Date of Patent: Dec. 5, 2023

(54) ARTICULATED OXYGEN CANDLE FURNACE BASKET

(71) Applicant: The United States of America, as represented by the Secretary of the Navy, Arlington, VA (US)

(72) Inventor: Benjamin E. Letter, Philadelphia, PA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 697 days.

(21) Appl. No.: 16/948,750

(22) Filed: Sep. 30, 2020

(51) Int. Cl.
  *C01B 13/02* (2006.01)
  *A62B 21/00* (2006.01)
  *F21V 35/00* (2006.01)
(52) U.S. Cl.
  CPC .......... *A62B 21/00* (2013.01); *C01B 13/0296* (2013.01); *F21V 35/00* (2013.01)

(58) Field of Classification Search
  CPC ...... A62B 21/00; C01B 13/0296; F21V 35/00
  USPC ......................................................... 422/120
  See application file for complete search history.

(56) References Cited

U.S. PATENT DOCUMENTS 7,503,141 B1 * 3/2009 Leeman ................. A01K 97/02
  43/44.99
2016/0311686 A1 * 10/2016 Humphreys ........ C01B 13/0218

FOREIGN PATENT DOCUMENTS

CN        208305744 U  *  1/2019

* cited by examiner

*Primary Examiner* — Huy Tram Nguyen
(74) *Attorney, Agent, or Firm* — Naval Surface Warfare Center, Philadelphia Division; Mark J. Rosen

(57) ABSTRACT

An articulated oxygen candle furnace basket is provided with a hinged assembly allowing opening and closing of the basket for simple insertion of fresh oxygen candles, and efficient removal of exhausted candles.

11 Claims, 2 Drawing Sheets

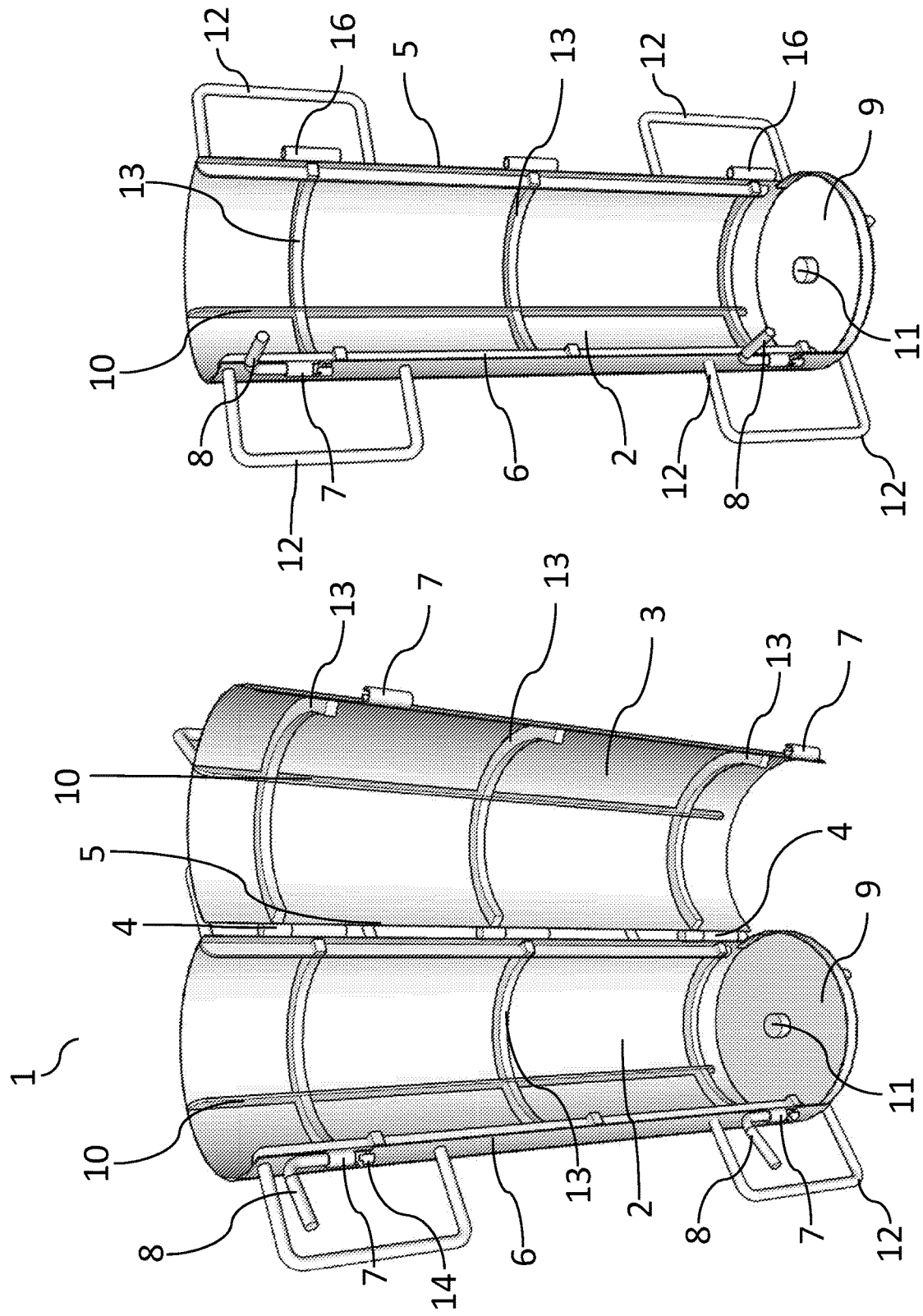

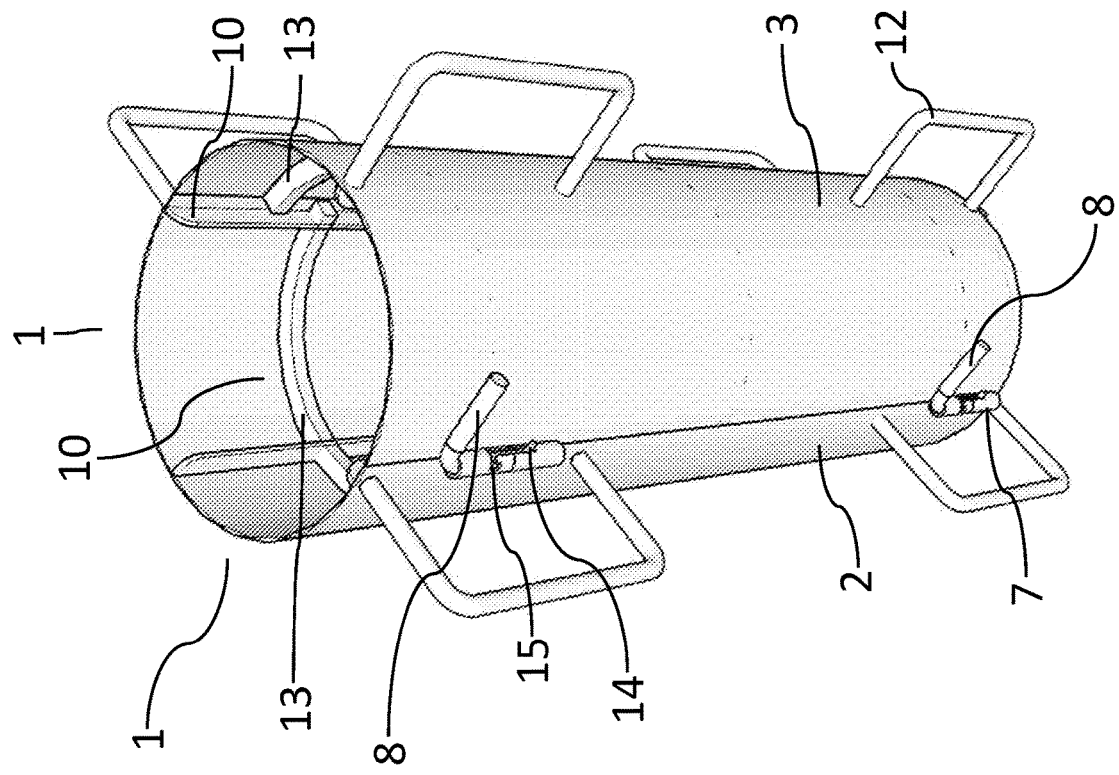
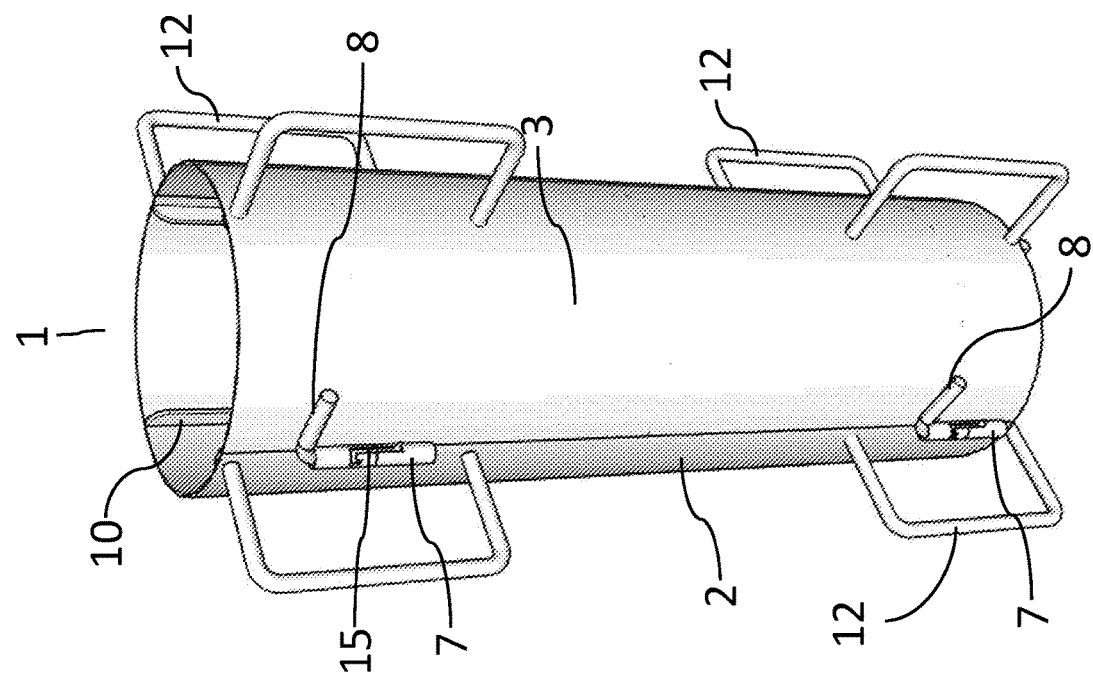

ARTICULATED OXYGEN CANDLE FURNACE BASKET

STATEMENT OF GOVERNMENT INTEREST

Noon The invention described herein may be manufactured and used by or for the Government of the United States of America for governmental purposes without payment of any royalties thereon or therefor.

Field of the Invention

The invention is related to the field of oxygen candle furnace baskets with advantages over the present state of the art and without disadvantages present in the art.

BACKGROUND OF THE INVENTION

Oxygen candles provide an alternative source of breathable air in situations where such breathable air is insufficient to support life, such as in emergency situations. Oxygen candles are used in otherwise enclosed spaces where the source of breathable air may be cut off, such as in space stations, airplanes, refuge chambers, mine shelters, naval vessels such as submarines, and the like. When a primary source of oxygenated breathable air has failed, or is insufficient to support life, oxygen generators such as oxygen candles may be used to supply sufficient oxygen to maintain life.

Oxygen candles generally rely on chemical reactions which yield oxygen. The source of the oxygen is typically sodium chlorate ($NaClO_3$). Additional components of an oxygen candle may include barium peroxide, iron powder, and a phosphorus tip for initiating the heat which drives the reaction producing oxygen. The reaction produces oxygen ($O_2$), sodium chloride (NaCl), and iron oxide ($Fe_2O_3$).

One potential hazard presented by the use of oxygen candles is the risk of fire. In order to mitigate against this risk, and to provide containment for the oxygen candle, the oxygen candle may be placed in an oxygen candle furnace basket. When the oxygen candle is spent, the basket may be emptied and a new oxygen candle placed therein. Conventional oxygen candle baskets are formed in the shape of a cylinder of steel or other sufficiently hard and heat resistant material, with one end closed. The empty space within the cylinder is sized to fit the oxygen candles intended to be used therein. Such baskets may have handles on one more locations along the surface of the cylinder to enable moving the basket from place to place. Depending on the height of the basket, a single long cylindrical oxygen candle may be placed within the basket. Alternatively, two or more shorter candles may be placed on top of each other up to the height of the basket.

Such conventional baskets suffer from several disadvantages. Spent oxygen candles tend to deform as the reactant fuel is exhausted. The deformation can be in the form of slumping in one more directions, expanding, or oozing, causing the spent candle to wedge within the basket. Even without deformation, spent oxygen candles tend to adhere to the basket's sides and bottom. These behaviors prevent removal of the spent candle by simply overturning the basket, and make it more difficult to remove the spent oxygen candle. One may overturn, shake, and pry at the spent candle but may still face difficulty removing it. Even once a spent candle is removed by prying or forcing the candle out, the basket will then require additional cleaning to remove all the adhered portions before a new oxygen candle can be placed in the basket. Such pieces of spent candles are known as clinkers. Moreover, prying, scraping, chipping, and other means of removing clinkers risk damaging the basket itself. In some cases the basket may be deformed in the process, rendering the basket misshapen in a manner making it difficult or impossible for insertion of a new candle.

The art is in need of improved oxygen candle furnace baskets without the disadvantages of current designs.

SUMMARY OF THE INVENTION

Having observed the aforementioned problems with conventional oxygen candle furnace baskets, the inventor provides solutions overcoming the aforementioned disadvantages.

In one solution, the invention provides a novel articulated oxygen candle furnace basket featuring a hinge mechanism allowing easy insertion of fresh oxygen candles and removal of spent oxygen candles. The hinge runs longitudinally parallel to the axis of the basket cylinder. The basket cylinder is constructed from two pieces, each approximately one half of a cylinder (i.e., 180 degrees of arc around the horizontal dimension), and the two halves are joined by the hinge. The hinge may fully span from the top to the bottom of the cylinder, along the entirety of the cylinder formed when the halves are in the closed position. Such a hinge may be in the form commonly known as a piano hinge, or continuous hinge, in which the hinge edges of the adjoined cylinder halves are each provided with segments of respectively interlocking hollow hinge knuckles, through which a hinge pin is inserted and affixed. The two cylinder halves are thereby maintained in an adjoined hinged state. Alternatively, the hinge need not span the entirety of the length of the cylinder halves, but rather may be formed by a multiplicity of interlocking hinge knuckle regions, occupying discrete portions along the edge adjoining the two cylinder halves, through which hinge pins are inserted forming pin hinges.

A bottom structure is attached to one end of one of the cylinder halves, normal to the axis of the cylinder. When the second cylinder half is rotated about the hinge to the open position, the bottom structure remains attached to the first cylinder half. When the second cylinder half is rotated about the hinge to the closed position, the two cylinder halves form an oxygen candle furnace basket in the form of a complete cylinder with a bottom structure attached, capable of holding one or more oxygen candles.

A closure is provided for securing the two halves together along their respective closure edges. The closure may be engineered similarly to the aforementioned hinge, however, the pin securing the knuckles is removable, allowing the cylinder halves to rotate about the hinge into the open position. The closure may have two or more sets of interlocking knuckles, secured by a single long locking pin designed to pass through all sets of knuckles. Alternatively, the closure may be secured by separate shorter removable locking pins. The removable locking pin typically has a bend at one end such that when inserted through the respective knuckles the two cylinder halves are suitably and securely adjoined but the locking pin is retained at the top of the closure by the bend. The locking pin may also be used as a pry bar to remove any adhered exhausted candle portions remaining after removal from the basket. The locking pin may also be shaped at one or both ends to assist in its prying ability to help prevent damage to the basket. The locking pins may alternatively be captive locking pins, using a stub attached to the bottom portion of the locking pins, which stub slides through guide channels in the closure knuckles to allow for partial removal of the locking pins. Such locking pins permit opening of the basket, but the locking pins themselves remain captive in the upper closure knuckle.

In one aspect, the invention is directed to an articulated oxygen candle furnace basket for containing an oxygen candle, which has a first half cylinder and a second half cylinder of equal radius, each having a hinging edge and a closure edge, wherein the first and second half cylinders are rotatably joined at their respective hinging edges by a hinge. The first and second half cylinders' respective closure edges each have a plurality of closure knuckles offset from each other such that the closure knuckles interlock when the respective closure edges are brought together. In another aspect, a plurality of locking pins may be inserted through the interlocked closure knuckles. In another aspect, the basket has a circular bottom structure attached to the first half cylinder in an orientation normal to the hinge edge and the closure edge, the circular bottom structure having a radius substantially equal to the radius of the first and second half cylinders. The oxygen candle furnace basket is closed by rotating the first and second half cylinders about the hinge, and locked by inserting the locking pins through the interlocked closure knuckles.

In another aspect, the articulated oxygen candle furnace basket has a plurality of interlocked hinge knuckles attached to the hinge edges of the first and second half cylinders. The basket may have a plurality of longitudinal ribs parallel to the hinge and closure edges attached to the interior surface, and may also have a plurality of circular ribs parallel to the bottom structure attached to the interior surface of each of the first and second half cylinders.

In one aspect, the bottom structure has a standoff with smaller diameter than the bottom structure itself, attached to the center of the bottom structure and thereby supporting the oxygen candle or candles. In another aspect, the bottom structure may have crossed ribs for supporting the candle or candles. In another aspect, the basket has a plurality of handles situate on its external surface. The components of the basket, including the cylinder halves, the ribs, the bottom structure, the handles, the knuckles, the hinge pins, and the locking pins are all made of a heat resistant metal, such as stainless steel.

In another aspect, the closure knuckles have guide channels and the locking pins have stubs adapted for sliding in the guide channels, thereby allowing for opening the basket while keeping the locking pins captive.

These and other aspects of the invention will be readily appreciated by those of skill in the art from the description of the invention herein.

BRIEF DESCRIPTION OF THE DRAWINGS

FIG. 1 depicts an embodiment of the articulated oxygen candle furnace basket of the invention in an open state.

FIG. 2 depicts an embodiment of the first cylinder half of the articulated oxygen candle furnace basket of the invention, with attached bottom structure.

FIG. 3 depicts an embodiment of the articulated oxygen candle furnace basket of the invention in a closed state.

FIG. 4 depicts an embodiment of the articulated oxygen candle furnace basket of the invention in a closed state.

DETAILED DESCRIPTION OF THE INVENTION

As described above, the invention provides a novel articulated oxygen candle furnace basket featuring a hinge mechanism allowing easy insertion of fresh oxygen candles. The basket is constructed from any of a variety of metals and alloys with sufficient strength and heat resistance. In one embodiment, the basket is constructed from stainless steel.

The hinge runs longitudinally and parallel to the axis of the basket cylinder. The basket cylinder is constructed from two pieces, each one half of a cylinder (i.e., 180 degrees of arc around the horizontal dimension), such that the two halves are joined by the hinge. The hinge may fully span from the top to the bottom of the cylinder, along the entirety of the cylinder formed when the halves are in the closed position. Such a hinge may be in the form commonly known as a piano hinge, or continuous hinge, in which the hinge edges of the adjoined cylinder halves are each provided with segments of respectively interlocking hollow knuckles, through which a pin is inserted and affixed. The two cylinder halves are thereby maintained in an adjoined hinged state. Alternatively, the hinge need not span the entirety of the length of the cylinder halves, but rather may be formed by a multiplicity of interlocking hinge knuckle regions, occupying discrete portions along the edge adjoining the two cylinder halves. In one embodiment, the hinge is two sets of knuckle and pin regions, each set being formed by interlocking knuckles from the respective cylinder halves. In another embodiment, the hinge has three such sets of knuckle and pin regions. Other embodiments may have additional sets of knuckle and pin regions. Hinge pins are then inserted through the interlocked hinge knuckles to secure the two cylinder halves together.

A bottom structure is attached to one end of one of the cylinder halves, normal to the axis of the cylinder. When the second cylinder half is rotated about the hinge to the open position, the bottom structure remains attached to the first cylinder half. When the second cylinder half is rotated about the hinge to the closed position, the two cylinder halves form an oxygen candle furnace basket having a complete cylinder with a bottom structure attached, capable of holding an oxygen candle furnace.

A closure is provided for securing the two halves together along their respective non-hinged edges. The closure may be engineered similarly to the aforementioned hinge; however, the pin securing the knuckles is a removable locking pin, allowing the cylinder halves to rotate about the hinge into the open position. The closure may have two or more sets of interlocking knuckles, secured by a single long locking pin designed to pass through all sets of knuckles. Alternatively, the closure may be secured by separate shorter removable locking pins. The removable locking pin generally has a bend at one end such that when inserted through the respective knuckles the two cylinder halves are suitably and securely adjoined and the locking pin is retained at the top of the closure by the bend.

In some embodiments, the locking pin may be equipped with a spline or splines such that it may be inserted and removed only when rotated into a particular orientation. The splined locking pin is inserted in such orientation and then rotated to a locked orientation in which it is captive and cannot be removed without first rotating the pin. The removed locking pin may also be used as a pry bar should it be necessary to remove any adhered exhausted candle portions remaining after removal from the basket. The locking pin may also be shaped at one or both ends to assist in its prying ability to help prevent damage to the basket.

In another embodiment the locking pin may have a horizontal protrusion, a stub, at its insertion end, and the interlocking knuckle pair is provided with a guide channel for accommodating the stub spanning completely through the knuckles. The stubbed locking pin may only be inserted through the knuckle pair in an orientation in which the stub slides through the guide channel. The locking pin may be rotated after insertion rendering it captive, such that the locking pin may not be removed without first rotating it.

In another similar embodiment, the locking pin cannot be fully removed at all, but may be lifted to allow opening the basket while remaining captive to one of the cylinder halves in the upper closure knuckle. Such a locking pin may have a stub at its insertion end, to keep the locking pin captive to one of the cylinder halves when the basket is opened. The locking pin without a stub is inserted through the interlocked pair of knuckles, then the stub is welded or otherwise affixed to the end of the locking pin. The lower knuckle of the interlocked pair is provided with a linear guide channel which accommodates the stub. The upper knuckle of the interlocked pair is provided with a curved guide channel having a lower linear portion which meets the lower knuckle's linear guide channel to form a continuous gap; a horizontal portion; and an optional second linear portion which does not span through the upper knuckle. In such an embodiment, as the user pulls the locking pin, the stub travels up the lower knuckle's guide channel until it exits the lower knuckle completely. The stub then continues to rise through the upper knuckle's lower linear portion until it enters the horizontal portion, at which point the stub prevents any further rise. Optionally, the user then rotates the locking pin to move the stub into the second linear portion, such that the locking pin is retained in the upper knuckle.

In some embodiments, the basket of the invention is provided with two or more ribs along the cylinder, typically 90-180 degrees apart from each other, extending longitudinally from the top of the basket to the bottom, or any portion thereof. Such ribs may be constructed from the same materials as the cylinder itself, or other suitable materials. In embodiments with ribs, the internal diameter of the cylindrical space bounded by the ribs is sufficient to hold the oxygen candles intended for use therein. Optionally, the basket may be provided with a plurality of horizontal circular ribs, similarly providing the basket with an internal diameter accommodating oxygen candles. The circular ribs on each cylinder half typically do not align to each other, thereby insuring gas may flow freely around the candle(s). The ribs provide space around the candles, allowing less or no contact with the walls of the cylinder itself, thereby reducing the potential points at which the candles may adhere to the basket, and assisting in easy removal of the spent candles. The ribs also provide structural support to the basket.

Similarly, in some embodiments the bottom structure of the basket is provided with raised ribs, typically in a crossed pattern (e.g., two full-diameter ribs crossing at 90 degrees in the center of the bottom structure), to provide a gap between the bottom of the oxygen candle and the full circular plane of the bottom structure. The ribs may be constructed of the same material as the bottom structure itself, or other suitable materials. The ribs on the bottom structure provide less points of contact for the candle to adhere to the basket, and thus promote easier removal of spent candles and clinkers.

In another embodiment, instead of ribs the bottom structure of the basket is provided with a raised central standoff having a substantially smaller diameter than the internal diameter of the basket. The central region of the oxygen candle rests on the standoff while the remaining majority of the area of the bottom of the oxygen candle is free from contact. Such a bottom structure minimizes the area of contact with oxygen candle, promoting easier removal of the spent candle and any clinkers.

In some embodiments, handles for carrying the basket may be attached to the basket at a variety of locations. Such handles are also useful for opening and closing the basket. In some embodiments such handles may be U-shaped lengths of metal, such as stainless steel, welded to the sides of the basket cylinder suitable for grasping with hands. The handles may be attached in pairs to the upper and lower portions of the cylinder, may be oriented vertically or horizontally, and may be provided in one, two, three, or more locations about the cylinder. For example, one arrangement of handles may have three pairs of upper and lower vertical handles placed at 90 degree intervals about the cylinder beginning near the hinge. Alternative, three pairs of upper and lower vertical handles may be spaced about the cylinder in 120 degree intervals. Handles at the lower portion of the basket may also extend into or below the bottom structure.

With reference to the Figures, a typical oxygen candle furnace basket 1 of the invention features a first half cylinder 2 and a second half cylinder 3 hinged together by a hinge along the longitudinal hinge edge 5 of each half cylinder. The hinge may be in the form of a piano hinge or pin hinges 4 as shown in FIG. 1, being formed by inserting hinge pins through the interlocking hinge knuckles 16. Typically the lower portions of the hinge pins are smaller in diameter than the upper portions such that when the hinge pins are inserted through the interlocked hinge knuckles 16 the two cylinder halves are joined together while allowing rotation about the hinge 4.

The longitudinal closure edges 6 of the half cylinders are provided with closure knuckles 7 offset respectively from each other such that when the closure edges 6 are brought together by rotating the half cylinders 2 and 3 about the hinge 4, the closure knuckles 7 interlock. This is referred to as the basket being in the closed state. One or more locking pins 8 may then be inserted through the interlocked closure knuckles 7, thereby locking the half cylinders 2 and 3 to each other. The closure edges 6 may have more than a single group of interlocking closure knuckles 7. In some embodiments there are two groups of interlocking knuckles 7. The locking pins may be provided with a stub 14 which slides through guide channels 15 provided in the knuckles 7.

The locking pins 8 may alternatively be splined for insertion in only a single orientation, such that they are retained in place when inserted and rotated into a non-removable orientation. In other embodiments, the locking pins 8 may be provided with alternative means of rendering them permanently or temporarily captive, as those of skill in the art will appreciate.

Attached to the first half cylinder 2 is a circular bottom structure 9 or plate with a radius equal to that of the half cylinders 2 and 3, attached along 180 degrees of its circumference to the first half cylinder 2. When the half cylinders 2 and 3 are rotated to the closed position, the half cylinders 2 and 3 and the bottom structure 9 form a contiguous half-closed cylinder, being a basket 1, the top of which remains open. The half-closed cylinder thereby defines a region of space within its interior suitable in size for an oxygen candle.

The basket 1 may be optionally provided with longitudinal ribs 10 running longitudinally down the interior of the basket, attached to the half cylinders 2 and 3. Additional optional circular ribs 13 may be provided. The bottom structure 9 likewise may be provided with a centered standoff 11. The ribs 10 and 13 on the sides and the standoff 11 on the bottom 9 provide a gap between the resident oxygen candle and the material of the basket 1, minimizing contact points where the exhausting oxygen candle can adhere. This makes removal of the spent oxygen candle more efficient.

The basket 1 may also have handles 12 attached to its exterior. In some embodiments, the handles 12 are provided as U shaped lengths of metal attached longitudinally in pairs at the upper and lower regions of the basket, and a plurality of such pairs of handles 12 may be provided at discrete positions around the circumference of the cylinder. In one embodiment, three pairs of handles 12 at 90 degrees, 180 degrees, and 270 degrees as measured from the hinge.

Attachment of the handles 12, the longitudinal ribs 10, the circular ribs 13, the standoff 11, and the bottom structure 9, to the cylinders 2 and 3 may be accomplished through any means of permanent attachment of metals, such as welding.

EXAMPLES

The following Example serves to illustrate the present invention and is not intended to limit its scope in any way.

Example 1

An Articulated Oxygen Candle Furnace Basket with a Pin Hinge

An articulated oxygen candle furnace basket 1 was constructed from 16 gauge stainless steel in dimensions 24 inches tall and 8 inches in diameter. The basket is suitable for fitting a pair of oxygen candles which are themselves 11 inches tall and 6.5 to 7 inches diameter. Such a pair of oxygen candles provide breathable air for one hour for about 150 people. The pair of candles weighs about 27 pounds prior to ignition, and weighs about 21 pounds at exhaustion. Such oxygen candles are generally constructed with sodium chlorate and iron powder with a higher concentration of iron in the region at the top one half inch of the oxygen candle.

The basket 1 was constructed by forming the first cylinder half 2 and the second cylinder half 3 from stainless steel sheets, each with a radius of 4 inches. A round stainless steel standoff 11 measuring one inch in diameter and one half inch in height was welded to a stainless steel bottom structure 9 measuring 8 inches in diameter, which was then welded to the first cylinder half 2. Longitudinal ribs 10 measuring one eighth inch thick and one half inch wide were welded to the first and second cylinder halves as depicted in FIGS. 1 and 2. Circular ribs 13 measuring three eighths inches thick and one half inch wide were welded to the first and second cylinder halves as depicted in FIGS. 1 and 2.

Two sets of closure knuckles 7 were welded to the non-hinge edges of the first and second cylinder halves 2 and 3 offset to interlock when the cylinder halves are rotated to the closed state. The closure knuckles were constructed with guide channels 15 as described above.

Three eighths inch round stainless steel handles 12 were welded to the first and second cylinder halves. The handles 12 were placed in vertical pairs, one pair adjacent to the hinge edge of the first cylinder half 2, one pair adjacent to the closure edge of the first cylinder half 2, and a third pair approximately centered on the second cylinder half 3.

Three sets of hinge knuckles 16 were welded to the hinge edges of the first and second cylinder halves 2 and 3, offset to interlock when the halves were joined. An example of the first cylinder half 2 prior to joining with the second cylinder half 3 by pin hinges 4 is shown in FIG. 2. Three hinge pins were inserted through the three sets of interlocked hinge knuckles 16 to form the pin hinges 4. The two cylinder halves 2 and 3 joined by the pin hinges 4 were then rotated toward each other such that the closure knuckles 7 interlocked.

Locking pins 8 were formed from three eighths inch round stainless steel approximately six inches long with a 90 degree bend. The locking pins 8 were inserted through the interlocked closure knuckles 7, bringing the basket to a closed state. A stainless steel stub 14 measuring one half inch long and one eighth inch round was welded to each of the locking pins 8 thereby preventing them from being removable. The completed basket in a closed state is represented in FIGS. 3 and 4. To open the basket the locking pins 8 are lifted, the stubs 14 slide through the guide channels 15, and the locking pins may rest at the second linear portion of the curved guide channel 15 in the upper closure knuckle. The interior dimensions of the basket are suitable for insertion of a pair of 11 inch tall oxygen candles. The exterior dimensions of the basket with protruding handles are suitable for placing the basket in a furnace.

The present invention is not to be limited in scope by the specific embodiments described above, which are intended as illustrations of aspects of the invention. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. An articulated oxygen candle furnace basket for containing an oxygen candle, comprising:
   a first half cylinder and a second half cylinder of equal radius, each having a hinging edge and a closure edge, wherein the first and second half cylinders are rotatably joined at their respective hinging edges by a hinge, and wherein the first and second half cylinders' respective closure edges each have a plurality of closure knuckles offset from each other such that the closure knuckles interlock when the respective closure edges are brought together;
   a plurality of locking pins adapted for insertion through the interlocked closure knuckles;
   a circular bottom structure attached to the first half cylinder in an orientation normal to the hinge edge and the closure edge, the circular bottom structure having a radius substantially equal to the radius of the first and second half cylinders; and,
   whereby the oxygen candle furnace basket is closed by rotating the first and second half cylinders about the hinge, and locked by inserting the locking pin through the interlocked closure knuckles.

2. The articulated oxygen candle furnace basket of claim 1, wherein the hinge comprises a plurality of interlocked hinge knuckles attached to the hinge edges of the first and second half cylinders.

3. The articulated oxygen candle furnace basket of claim 1, further comprising a plurality of longitudinal ribs parallel to the hinge and closure edges attached to an interior surface of each of the first and second half cylinders.

4. The articulated oxygen candle furnace basket of claim 1, further comprising a plurality of circular ribs parallel to the bottom structure attached to an interior surface of each of the first and second half cylinders.

5. The articulated oxygen candle furnace basket of claim 1, wherein the bottom structure further comprises a standoff with smaller diameter than the bottom structure attached to a center of the bottom structure.

6. The articulated oxygen candle furnace basket of claim 1, wherein the bottom structure further comprises a plurality of ribs for supporting the oxygen candle furnace.

7. The articulated oxygen candle furnace basket of claim 1, further comprising a plurality of handles situate on an external surface of each of the first and second half cylinders.

8. The articulated oxygen candle furnace basket of claim 1, wherein the first and second half cylinders are composed of a metal. steel.

9. The articulated oxygen candle furnace basket of claim 8, wherein the metal is stainless steel.

10. The articulated oxygen candle furnace basket of claim 1, wherein the closure knuckles further comprise guide channels.

11. The articulated oxygen candle furnace basket of claim 10, wherein the locking pins further comprise stubs adapted for sliding in the guide channels.

\* \* \* \* \*